US010341296B2

(12) United States Patent
Bhagwat et al.

(10) Patent No.: US 10,341,296 B2
(45) Date of Patent: Jul. 2, 2019

(54) FIREWALL CONFIGURED WITH DYNAMIC COLLABORATION FROM NETWORK SERVICES IN A VIRTUAL NETWORK ENVIRONMENT

(71) Applicant: VMWARE, INC., Palo Alto, CA (US)

(72) Inventors: Abhinav Vijay Bhagwat, Pune (IN); Aravind Srinivasan, Pune (IN); Amit Ratnapal Sangodkar, Pune (IN)

(73) Assignee: VMWARE, INC., Palo Alto, CA (US)

( * ) Notice: Subject to any disclaimer, the term of this patent is extended or adjusted under 35 U.S.C. 154(b) by 278 days.

(21) Appl. No.: 14/025,850

(22) Filed: Sep. 13, 2013

(65) Prior Publication Data
US 2015/0082417 A1 Mar. 19, 2015

(51) Int. Cl.
H04L 29/06 (2006.01)

(52) U.S. Cl.
CPC .......... H04L 63/0263 (2013.01); H04L 63/02 (2013.01); H04L 63/0227 (2013.01); H04L 63/0272 (2013.01)

(58) Field of Classification Search
CPC . H04L 63/02; H04L 63/0227; H04L 63/0263; H04L 63/0272
See application file for complete search history.

(56) References Cited

U.S. PATENT DOCUMENTS

| 8,549,187 | B1 | 10/2013 | Christopher et al. |
| 8,909,780 | B1 | 12/2014 | Dickinson et al. |
| 9,047,109 | B1* | 6/2015 | Wang .................. G06F 9/45533 718/1 |
| 2002/0010799 | A1* | 1/2002 | Kubota ............. H04L 29/12009 709/249 |
| 2007/0094411 | A1 | 4/2007 | Mullane et al. |
| 2008/0250407 | A1 | 10/2008 | Dadhia et al. |
| 2009/0300178 | A1 | 12/2009 | Saunderson et al. |
| 2010/0302974 | A1 | 12/2010 | Niiyama et al. |
| 2010/0322087 | A1* | 12/2010 | Draznin .............. H04L 43/0876 370/252 |
| 2010/0333165 | A1* | 12/2010 | Basak et al. ...................... 726/1 |
| 2012/0117241 | A1* | 5/2012 | Witt ........................ G06F 17/30 709/226 |
| 2012/0173742 | A1 | 7/2012 | Noldus et al. |
| 2012/0297037 | A1 | 11/2012 | Kumagai et al. |
| 2013/0019277 | A1* | 1/2013 | Chang ................. H04L 63/0218 726/1 |
| 2013/0132545 | A1 | 5/2013 | Schultze et al. |
| 2013/0311991 | A1 | 11/2013 | Li et al. |

(Continued)

Primary Examiner — Samson B Lemma
Assistant Examiner — Arya Golriz

(57) ABSTRACT

Techniques for automatic firewall configuration in a virtual network environment are described. In one example embodiment, firewall rules are configured using virtual machine (VM) inventory objects. The firewall rules are then transformed by replacing the VM inventory objects in the configured firewall rules with associated Internet protocol (IP) addresses using an IP address management table (IPAM) table and a network address translation (NAT) table. The transformed firewall rules are then sent to a firewall engine for filtering communication from and to VMs running on a first machine on one or more computing networks and communication from and to VMs running on a second machine on one or more computing networks at a firewall according to the transformed firewall rules.

18 Claims, 4 Drawing Sheets

(56) References Cited

U.S. PATENT DOCUMENTS

| | | | |
|---|---|---|---|
| 2014/0052877 A1* | 2/2014 | Mao | H04L 61/103 |
| | | | 709/245 |
| 2014/0130044 A1 | 5/2014 | Zhang et al. | |
| 2015/0052522 A1 | 2/2015 | Chanda et al. | |
| 2015/0120911 A1 | 4/2015 | Devnath et al. | |

* cited by examiner

FIREWALL CONFIGURED WITH DYNAMIC COLLABORATION FROM NETWORK SERVICES IN A VIRTUAL NETWORK ENVIRONMENT

TECHNICAL FIELD

The present disclosure relates generally to a firewall in a computing network environment and, more particularly, to automatically configuring the firewall based on any updates made to network services in a virtual network environment.

BACKGROUND

A network firewall commonly serves as a primary line of defense against external threats to an organization's computer systems, networks and critical information. A firewall may serve as a network gateway that applies a security policy to filter traffic between a network under private administrative control, such as a corporate Intranet, and public network, such as the Internet. A firewall also can be used to partition networks and to partition or to interconnect virtual private networks (VPNs). A firewall may be used within a network to impose communications policies between sub-networks or machines within a network. A firewall may define different policies to govern communications between different networks, sub-networks or machines.

Information is ordinarily transmitted within networks in packets, and the term packet refers to a unit of data communicated within a network. A packet typically includes a packet source identifier and a packet destination identifier used to navigate the packet data through a network. The term packet may refer to a unit of data through a network. The term packet may refer to a unit of data communicated at any level of the open source interconnection (OSI) protocol stack and between levels of the OSI stack.

A firewall inspects and filters packets at an interface between networks and passes or blocks packets based upon user-defined criteria. The filtering involves a decision making process that includes checking contents of packets entering or leaving an associated network and passing or denying passage of packets through the firewall depending upon whether the packets comply with the predefined access rules.

A security administrator ordinarily configures firewall rules within a file. The firewall rules instruct a firewall engine as to which packets to pass and which to block. A typical firewall rule identifies a packet source, a packet destination, service group (e.g., port number and protocol) and an appropriate action, such as to pass or drop a packet or report the packet. A firewall may have several network interfaces. The firewall intercepts and inspects packets that enter any of its network interfaces to identify matches between the packet contents and the security rules the firewall has been configured to enforce.

The following is an example firewall rule: Source—ANY, Destination—192.148.120.12, Port—80. Protocol—transmission control protocol (TCP), Action—Accept, where server to which port 80 hyper text transmission protocol (HTTP) traffic is to be allowed; and ANY signifies all devices on the network (i.e., all addresses on the network).

The above firewall rule identifies a specific destination machine Internet Protocol (IP) address as condition for application of the rule, and indicates that any source machines address suffices to meet another condition for the application of the above firewall rule. Thus, the above firewall rule is an example firewall rule that includes a pair of machine identifier dependent conditions.

One challenge with defining firewall rules in terms of source and destination addresses is the need for an administrator to continually update firewall rules to keep abreast of changes in network configuration. Machines may be added or removed from a network, and machines' IP addresses can change from time to time, requiring corresponding changes to firewall rules.

Further, in complex networks in which changes are many and frequent, the need to update firewall rules to keep pace with changes to the network configuration, such as user configured firewall rules, network interface controller (NIC) assigned IP addresses in IP address management (IPAM) table, network address translation (NAT) addresses in NAT table, virtual machine (VM) inventory objects and the like can pose a significant challenge. This is even more a challenge in a virtual network environment where firewalls cannot be configured when the virtual machines (VMs) are not powered on because typically firewall rules cannot be configured if the VMs do not exist.

DETAILED DESCRIPTION

Embodiments described herein provide enhanced computer- and network-based methods, techniques, and systems for firewall configuration using dynamic collaboration with network services in a virtual network environment. The firewall engine residing in the management layer based on object representation maps it to an Internet Protocol (IP) address and automatically configures the firewall located in the data path layer based on the mapping information. Basically the technique involves formulating firewall rules using virtual machine (VM) identifiers and machine attributes, such as an IP address from a network address translation (NAT) table and a network interface card (NIC) assigned IP address from an IP address management (IPAM) table. Using this technique allows the firewall to be automatically updated anytime VMs are changed or reconfigured.

Further, the utility value of configuring firewall rules using VM inventory objects to the network administrator is enhanced by significantly reducing the need for an administrator to manually revisit the firewall rules and make corresponding changes to the firewall rules whenever the firewall rules are configured using IP addresses or every time the IP address changes. Furthermore, by using VM inventory objects, an administrator is not required to make these changes manually; the system takes care of updating the firewall rules automatically anytime there are any changes in the IP addresses.

System Overview and Examples of Operation

Figure 1:
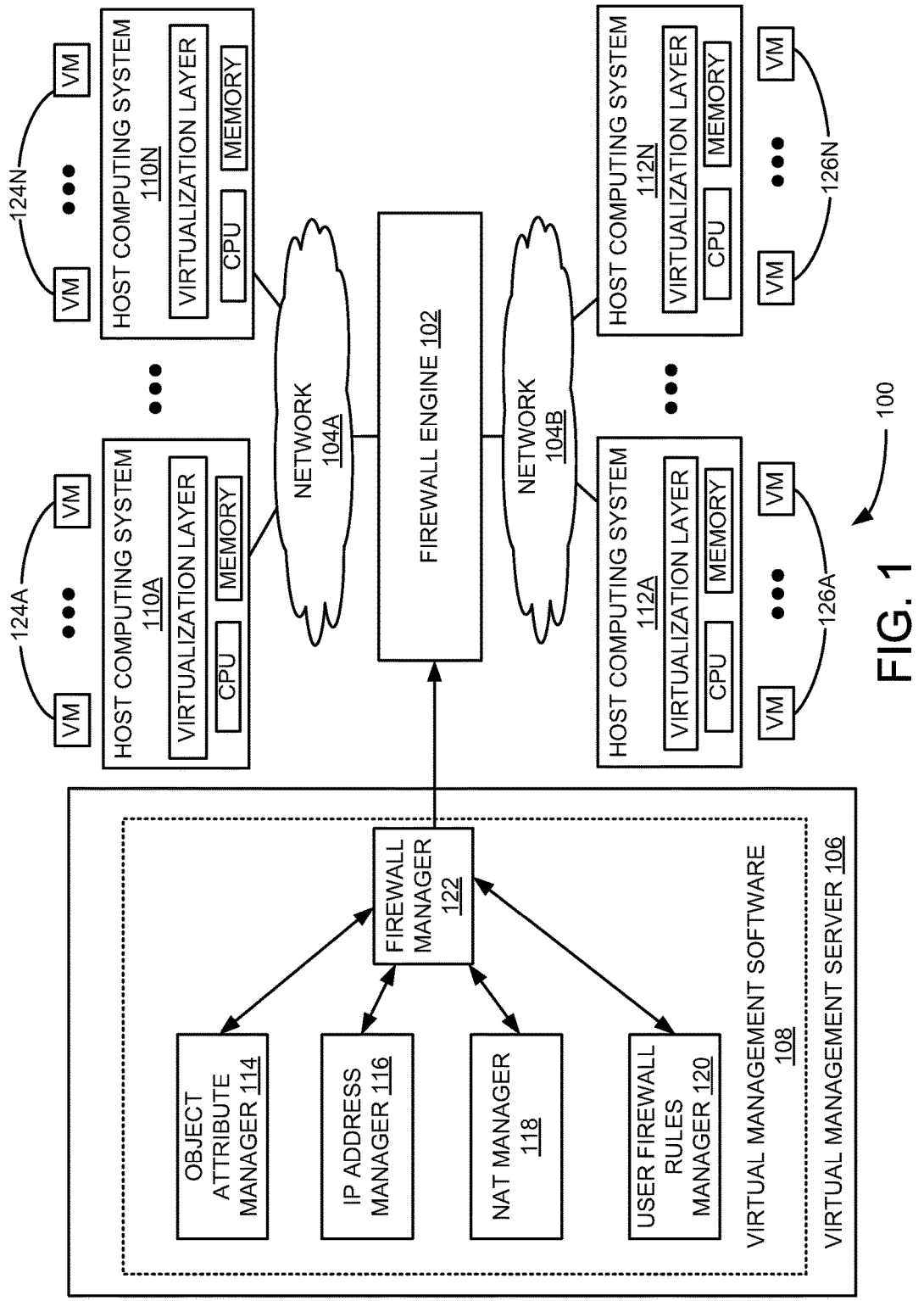
FIG. 1 is a block diagram illustrates using dynamically collaborated and managed network services for automatic firewall configuration in a virtual network environment, according to an example embodiment.

FIG. 1 is a block diagram that illustrates using dynamically collaborated and managed network services for automatic firewall configuration in virtual network environment 100, according to an example embodiment. As shown in FIG. 1, virtual network environment 100 includes plurality of host computing systems 110A-110N and plurality of VMs 124A-124N, respectively, hosted by host computing systems 110A-110N. Similarly as shown in FIG. 1, virtual network environment 100 includes plurality of host computing systems 112A-112N and associated plurality of VMs 126A-126N, respectively, hosted by host computing systems 112A-112N. Also as shown in FIG. 1, virtual network environment 100 includes computing networks 104A and 104B and firewall engine 102. Further as shown in FIG. 1, host computing systems 110A-110N are coupled communicatively via network 104A to firewall engine 102. Similarly as shown in FIG. 1, host computing systems 112A-112N are coupled communicatively via network 104B to firewall engine 102.

Also as shown in FIG. 1, virtual network environment 100 includes virtual management server 106. Further as shown in FIG. 1, virtual management server 106 includes virtual management software 108 to provide any needed automated operations management and proactive performance management and to gain visibility across the physical and virtual infrastructures. Furthermore as shown in FIG. 1, virtual management software 108 includes object attribute manager 114, Internet Protocol (IP) address manager 116, NAT manager 118, user firewall rules manager 120 and firewall manager 122. In addition as shown in FIG. 1, firewall manager 122 is communicatively coupled to firewall engine 102.

Figure 2:
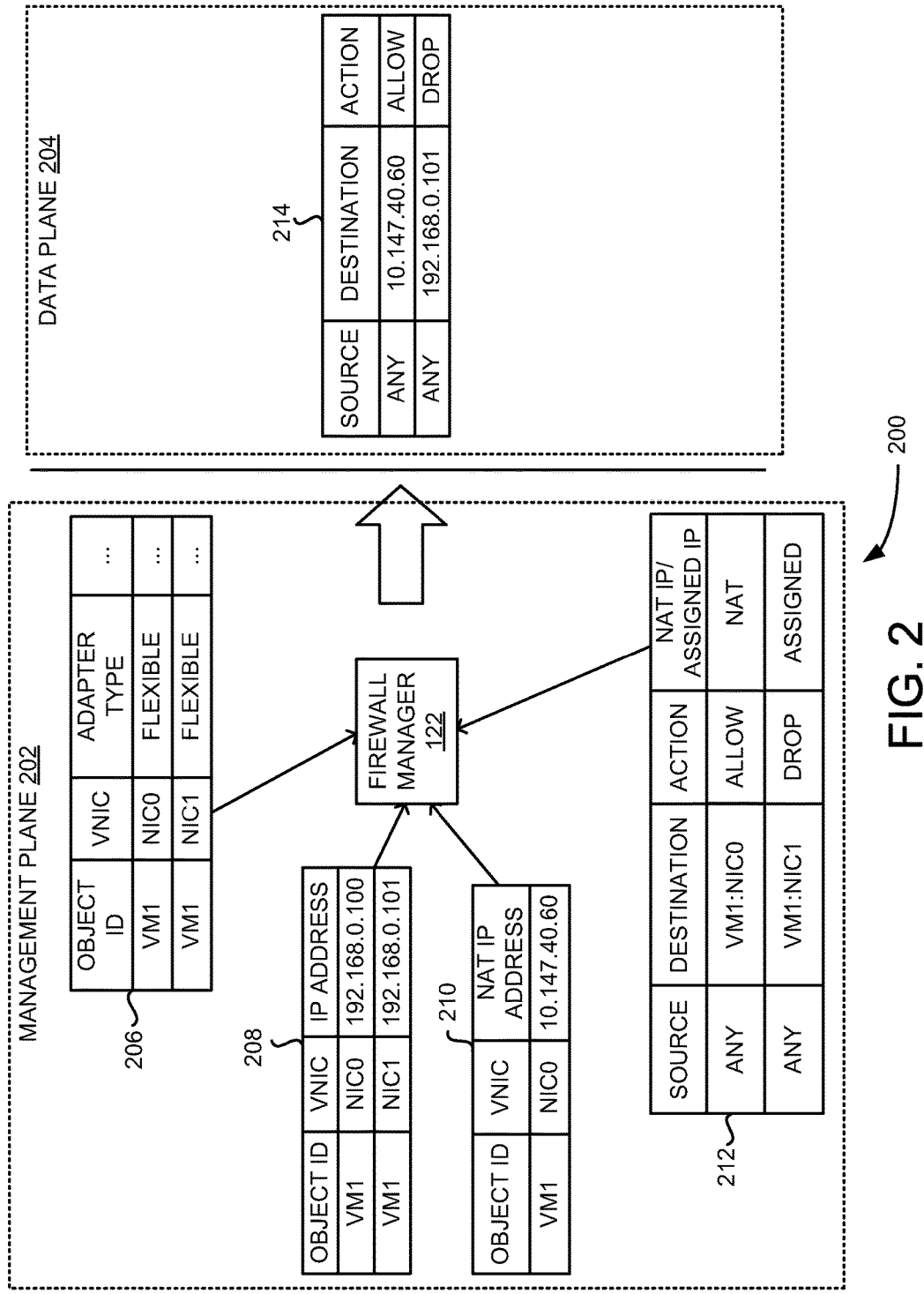
FIG. 2 is a block diagram of a communication system that includes multiple components associated with the dynamically collaborated and managed network services that includes an automatically configurable firewall to impose polices based on interaction with different components of the communication system, according to an example embodiment.

In operation, firewall manager 122 configures firewall rules using VM inventory objects from VM object attribute table 206 (shown in FIG. 2) via object attribute manager 114. Firewall manager 122 then transforms the firewall rules by replacing the VM inventory objects in the configured firewall rules with associated IP addresses using IP address management table (IPAM) table 208 (shown in FIG. 2) via IP address manager 116, and network address translation (NAT) table 210 (shown in FIG. 2) via NAT manager 118. Firewall manager 122 then sends the transformed firewall rules to firewall engine 102 for filtering communication from and to VMs 124 running on a first host computing system 110 on the one or more computing networks and communication from and to VMs 126 running on a second host computing system 112 on the one or more computing networks at a firewall according to the transformed firewall rules. In these embodiments, firewall manager 122 is configured to filter traffic between VMs residing on the same or different host computing systems.

Firewall manager 122 then determines whether there are any updates made to the configured firewall rules, IPAM table 208, NAT table 210 and/or the VM inventory objects. In these embodiments, firewall manager 122 can determine the updates for other tables or the other sub components. Further, VMs 124 A-N and 126 A-N may proactively send an update to firewall manager 122 when there is any change in their respective configurations. If there are any updates made to the configured firewall rules, IPAM table 208, NAT table 210 and/or the VM inventory objects, firewall manager 122 automatically updates the transformed firewall rules sent to firewall engine 102 by repeating the steps of configuring, transforming and sending to firewall engine 102. If there are no updates to the configured firewall rules, IPAM table 208, NAT table 210 and/or the VM inventory objects, firewall manager 122 continues the step of determining whether there are any updates made to the configured firewall rules, IPAM table 208, NAT table 210 and/or the VM inventory objects.

Object attribute manager 114, IP address manager 116, NAT manager 118, and firewall manager 122 dynamically maintains updates to VM object attribute table 206, IPAM table 208, NAT table 210 and configured firewall rules 214 (shown in FIG. 2), respectively. Example updates include addition/deletion of a VM, addition/deletion of a virtual network interface cards (vNIC) to a VM, change in a network property of the vNIC, change in a VM NAT address of the vNIC, change of a VM assigned IP address, change in user configured firewall rules, such as add/delete of a firewall rule or update of a firewall rule in which a source/destination VM inventory object referenced changes. In these embodiments, the VM inventory objects are a collection of virtual objects. Further in these embodiments, the virtual objects are VMs and/or vNICs.

In some embodiments, if user configured firewall rules 212 (shown in FIG. 2) are specified using NIC assigned IP addresses, then firewall manager 122 replaces any of the VM inventory objects specified in the source and/or destination of the configured firewall rules with the assigned IP address of the VM inventory object. Further, in these embodiments, if user configured firewall rules 212 are specified using NAT assigned IP addresses, then firewall manager 122 replaces any of the remaining VM inventory objects specified in the source and/or destination of the configured firewall rules with the NAT IP address of the VM inventory objects by using the NAT table. Furthermore in some embodiments, firewall manager 122 stores the configured firewall rules and the transformed firewall rules in machine readable storage media.

Also, although certain terms are used primarily herein, other terms could be used interchangeably to yield equivalent embodiments and examples. For example, the term "automatic" may be used interchangeably with "dynamic" For example, the term "virtual network environment" may be used interchangeably with "virtual computing network environment". For example, the term "changes" may be used interchangeably with "updates", "revisions" or the like. Further for example, it is well-known that equivalent terms in the field of system virtualization or similar or related fields could be substituted for such terms as "physical computer," "hypervisor," "virtual machine," or the like. The term IPAM refers to planning, tracking, and managing the Internet Protocol address space used in a network. Also the term, NAT refers to the process of modifying IP address information in IPv4 headers while in transit across a traffic routing device, i.e., providing a one-to-one translation of IP addresses.

Numerous specific details are set forth herein, such as data formats and code sequences, and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described are not limited by the particular order, selection, or decomposition of aspects described with reference to any particular routine, module, component, or the like.

Example Processes

Figure 3:
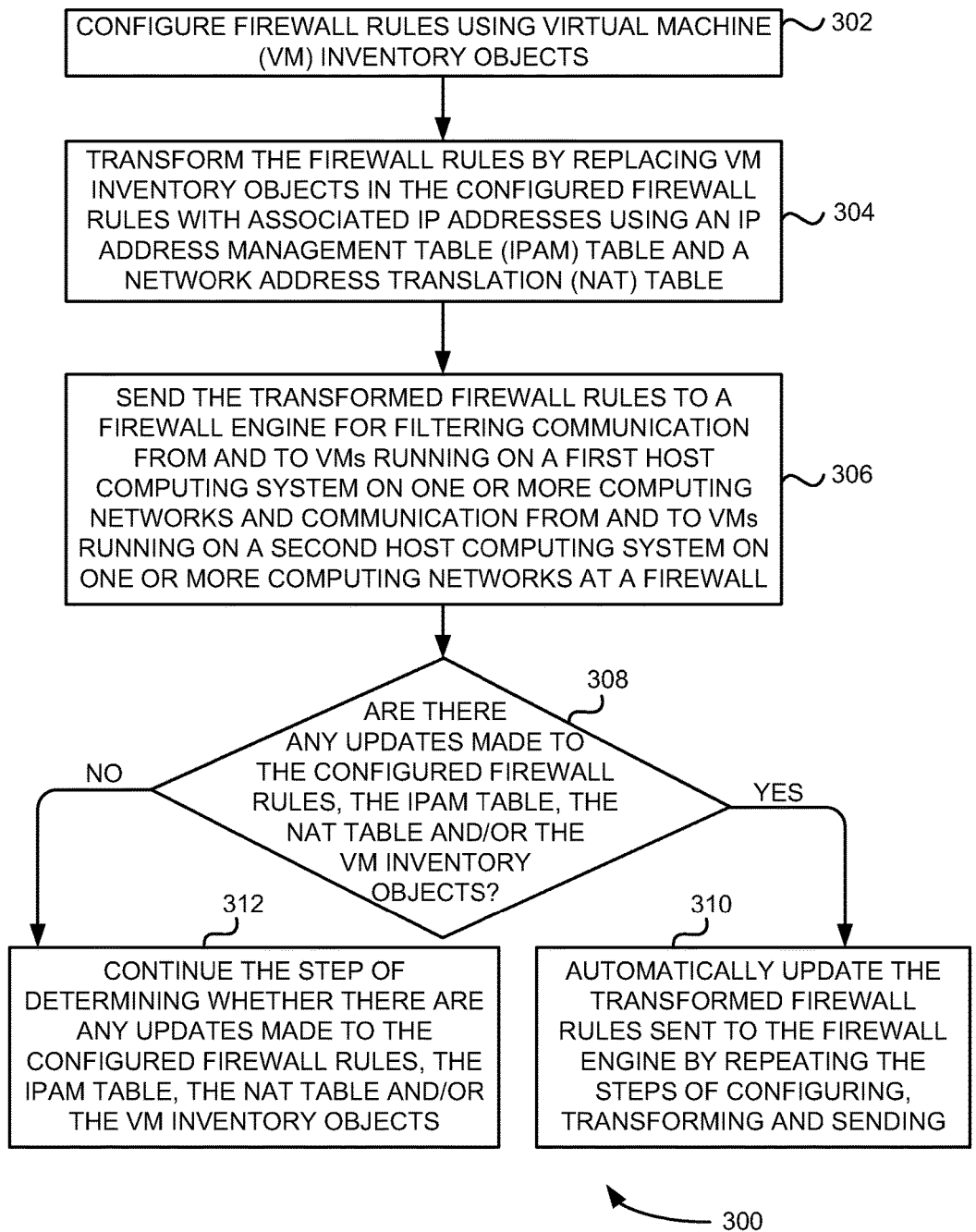
FIG. 3 is a flow diagram of a process for configuring firewall using dynamic collaboration with network services in a virtual network environment, according to an example embodiment.

FIG. 3 is a flow diagram of a process 300 for automatic firewall configuration in a virtual computing network environment, according to an example embodiment. FIG. 3 illustrates process 300, by using VM inventory objects, updates firewall rules automatically anytime there are any changes in IP addresses and significantly reduces the need to manually change the firewall rules by an administrator.

At block 302, the process 300 configures the firewall rules using the VM inventory objects. At block 304 the firewall rules are transformed by replacing the VM inventory objects in the configured firewall rules with associated IP addresses using an IPAM table and a NAT table. In some embodiments, any of the VM inventory objects specified in a source and/or destination of the configured firewall rules are replaced with the assigned IP address of the VM inventory object, if a user configured firewall rule specifies using NIC assigned IP addresses. Further in these embodiments, any of the remaining VM inventory objects specified in the source and/or destination of the configured firewall rules are replaced with the NAT IP address of the VM inventory objects by using the NAT table, if the user configured firewall rule specifies using NAT assigned IP addresses.

At block 306, the transformed firewall rules are sent to a firewall engine for filtering communication from and to VMs running on a first host computing system on one or more computing networks and communication from and to VMs running on a second host computing system on one or more computing networks at the firewall according to the transformed firewall rules. Also, the transformed firewall rules may be sent to the firewall engine for filtering communication between two VMs running on same host computing system.

At block 308, the process 300 determines whether there are any updates made to the configured firewall rules, the IPAM table, the NAT table and/or the VM inventory objects. At block 310, process 300 automatically updates the transformed firewall rules sent to the firewall engine by repeating the steps of configuring, transforming and sending, if the updates are made to the configured firewall rules, the IPAM table, the NAT table and/or the VM inventory objects. At block 312, process 300 continues the step of determining whether there are any updates made to the configured firewall rules, the IPAM table, the NAT table and/or the VM inventory objects, if there are no updates made to the configured firewall rules, the IPAM table, the NAT table and/or the VM inventory objects.

Further in these embodiments, the process 300 dynamically maintains updates to a VM object attribute table, the IPAM table, the NAT table and/or the configured firewall rules. Furthermore in these embodiments, the process 300 stores the configured firewall rules and the transformed firewall rules in machine readable storage media.

Example Computing System Implementation

Figure 4:
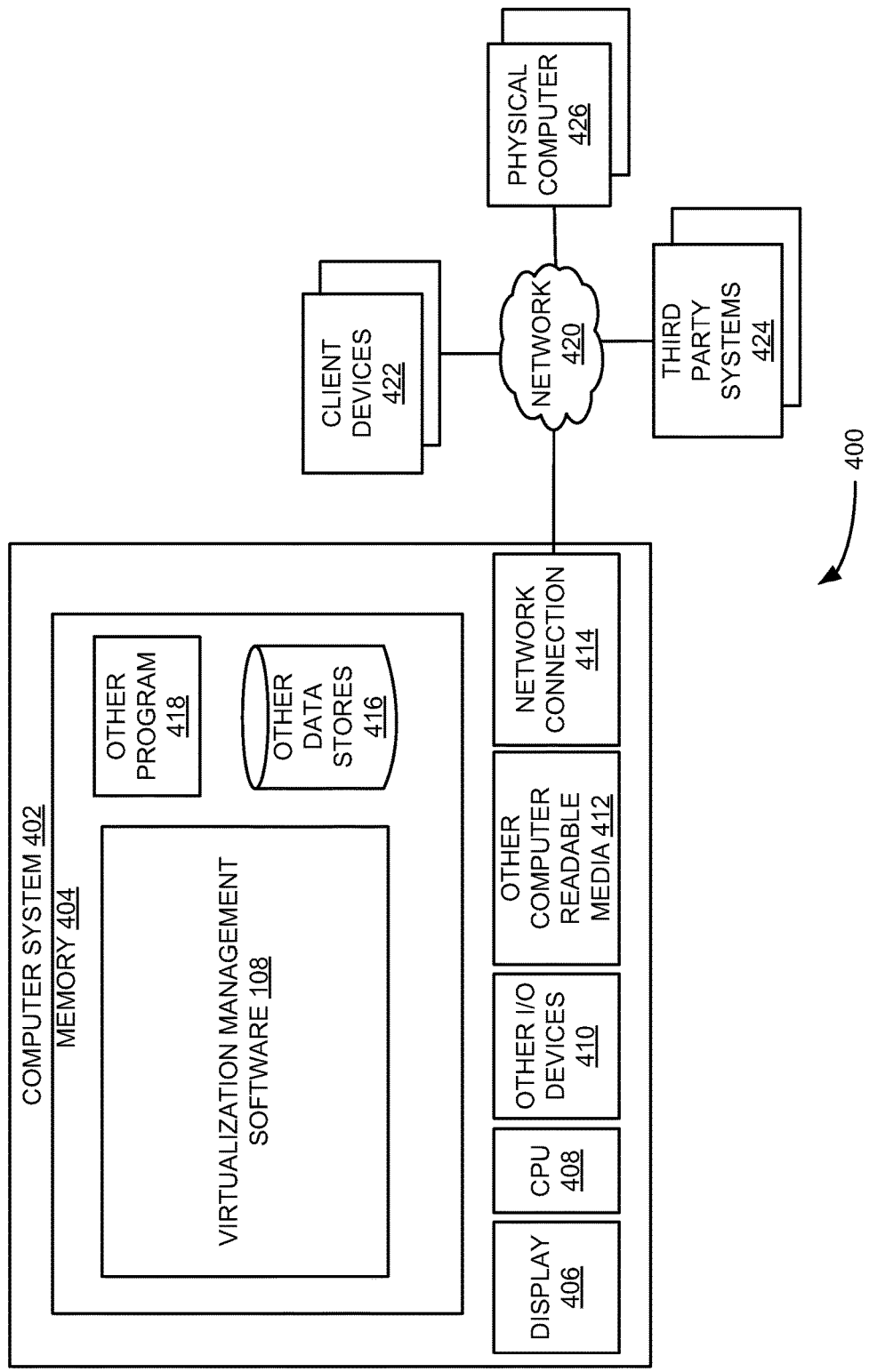
FIG. 4 is a block diagram of an example computing system for implementing the automatically configurable firewall, such as those shown in FIGS. 1-3, accordingly to am example embodiment.

FIG. 4 is block diagram 400 of an example computing system for performing automatic firewall configuration in a virtual network environment, according to an example embodiment. In particular, FIG. 4 shows computing system 402 that may be utilized to implement virtual management software 108, such as shown in FIG. 1.

Note that one or more general purpose virtual or physical computer systems suitably instructed may be used to implement virtual management software 108 including firewall manager 122 (shown in FIG. 1). In addition, computing system 402 may comprise one or more distinct computing systems/devices and may span distributed locations. Furthermore, each block shown may represent one or more such blocks as appropriate to a specific embodiment or may be combined with other blocks. Also, virtual management software 108 including firewall manager 122 may be implemented in software, hardware, firmware, or in some combination to achieve the capabilities described herein.

In the embodiment shown, computing system 402 may comprise computer memory ("memory") 404, display 406, one or more Central Processing Units ("CPU") 408, Input/Output (I/O) devices 410 (e.g., keyboard, mouse, etc.), other computer-readable media 412, and network connections 414. Virtual management software 108 is shown residing in memory 404. The components of virtual management software 108 may execute on one or more CPUs 408 and implement techniques described herein. Other code or programs 418 (e.g., an administrative interface, a Web server, and the like) and potentially other data repositories, such as data store 416, may also reside in memory 404, and execute on one or more CPUs 408. One or more of the components in FIG. 4 may not be present in any specific implementation. For example, some embodiments may not provide other computer readable media 412 or display 406.

Virtual management software 108 interacts via network 420 with client devices 422, physical computers 426, and/or third-party systems/applications 424. Network 420 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

As discussed above with reference to FIGS. 1-3, virtual management software 108 including firewall manager 122 automatically configures firewall in the virtual computing network environment. The architecture shown in FIG. 4 may in some embodiments be partially or fully virtualized. For example, computer system 402 may be one or possibly many VMs executing on physical hardware and managed by a hypervisor, virtual machine monitor, or similar technology. Also, physical computers 426 may include virtualization logic to manage multiple VMs.

In an example embodiment, components/modules of virtual management software 108 are implemented using standard programming techniques. For example, virtual management software 108 may be implemented as a "native" executable running on CPU 408, along with one or more static or dynamic libraries. In other embodiments, virtual management software 108 may be implemented as instructions processed by a VM that executes as one of other programs 418.

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

Furthermore, in some embodiments, some or all of the components of virtual management software 108 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Further, from the foregoing it will be appreciated that, although specific embodiments have been described herein for purposes of illustration, various modifications may be made without deviating from the spirit and scope of this disclosure. For example, the methods, techniques, and systems for automatic firewall configuration in a virtual computing network environment Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for automatic firewall configuration in a virtual computing network environment, the method comprising:
    mapping virtual machine (VM) inventory objects to Internet protocol (IP) addresses of VMs running on a plurality of host computing systems on one or more computing networks, wherein the VM inventory objects are VMs and associated virtual network interface cards (vNICs);
    configuring firewall rules using VM inventory objects based on the mapping, wherein the VM inventory objects are specified in a source and/or destination of the configured firewall rules;
    transforming the firewall rules by replacing the VM inventory objects that are specified in the source and/or destination of the configured firewall rules with network interface card (NIC) assigned IP addresses using an IP address management table (IPAM) table and network address translation (NAT) IP addresses using a NAT table;
    sending the transformed firewall rules to a firewall engine for filtering communication from and to VMs running on a first host computing system on the one or more computing networks and communication from and to VMs running on a second host computing system on the one or more computing networks at a firewall according to the transformed firewall rules;
    determining whether there are any updates made to the configured firewall rules, the IPAM table, the NAT table and/or the VM inventory objects; and
    automatically updating the transformed firewall rules sent to the firewall engine by repeating the steps of configuring, transforming and/or sending when there are updates made to the configured firewall rules, the IPAM table, the NAT table and/or the VM inventory objects.

2. The method of claim 1,
    continuing the step of determining whether there are any updates made to the configured firewall rules, the IPAM table, the NAT table and/or the VM inventory objects when there are no updates made to the configured firewall rules, the IPAM table, the NAT table and/or the VM inventory objects.

3. The method of claim 2, further comprising:
    dynamically maintaining updates to a VM object attribute table, the IPAM table, the NAT table and/or the configured firewall rules.

4. The method of claim 2, wherein the update includes addition of a VM, deletion of a VM, change in a network property of a vNIC, addition/deletion of a vNIC to a VM, change of, a VM, assigned IP address, change of a VM NAT address, and change in user configured firewall rules, wherein the change in user configured firewall rules is add/delete of a firewall rule or update of a firewall rule in which a source/destination VIM inventory object referenced changes.

5. The method of claim 1, wherein transforming the firewall rules by replacing the VM inventory objects with the NIC assigned IP addresses using the IPAM table and the NAT IP addresses using the NAT table, comprises:
    replacing any of the VM inventory objects specified in the source and/or destination of the configured firewall rules with a NIC assigned IP address of the VM inventory oject, if a user configured firewall rule specifies using the NIC assigned IP addresses; and
    replacing any of the remaining VM inventory objects specified in the source and/or destination of the configured firewall rules with a NAT IP address of the VM inventory objects by using the NAT table, if the user configured firewali rule specifies using NAT assigned IP addresses.

6. The method of claim 1, further comprising:
    storing the contigured firewall rules and the transformed fire wall rules in machine readable storage media.

7. A non-transitory computer-readable storage medium including instructions that are configured, when executed by a computing system, to perform a method for automatic firewall configuration in a virtual network environment, the method comprising:
    mapping virtual machine (VM) inventory objects to Internet protocol (IP) addresses of VMs running on a plurality of host computing systems on one or more computing networks, wherein the VM inventory objects are VMs and associated virtual network interface cards (vNICs);

configuring firewall rules using VM inventory objects based on the mapping, wherein the VM inventory objects are specified in a source and/or destination of the configured firewall rules;

transforming the firewall rules by replacing VM inventory objects that are specified in the source and/or destination of the configured firewall rules with network interface card (NIC) assigned IP addresses using IP address management table (IPAM) table and network address translation (NAT) IP addresses using a NAT table;

sending the transformed firewall rules to a firewall engine for filtering communication from and to VMs running on a first host computing system on the one or more computing networks and communication from and to VMs running on a second host computing system on the one or more computer networks at a firewall according to the transformed firewall rules;

determining whether there are any updates made to the configured firewall rules, the IPAM table, the NAT table and/or the VM inventory objects; and automatically updating the transformed firewall rules sent to the firewall engine by repeating the steps of configuring, transforming and/or sending when there are updates made to the configured firewall rules, the IPAM table, the NAT table and/or the VM inventory objects.

8. The non-transitory computer-readable storage medium of claim 7, further comprising:

continuing the step of determining whether there are any updates made to the configured firewall rules, the IPAM table, the NAT table and/or the VM inventory objects when there are no updates made to the configured firewall rules, the IPAM table, the NAT table and/or the VM inventory objects.

9. The non-transitory computer-readable storage medium of claim 8 further comprising:

dynamically maintaining updates to a VM object attribute table, the IPAM table, the NAT table and/or the configured firewall rules.

10. The non-transirtoy computer-readable storage medium of claim 9, wherein the update includes addition of a VM, deletion of a VM, and/or change in network property of vNIC, change of VM assigned IP address, change of VM NAT address, change in user configured firewall rules such as add/delete of a rule or update of firewall rule its which the source/destination VM inventory object referenced changes.

11. The non-transitory computer-readable storage medium of claim 7, wherein transforming the firewall rules by replacing the VM inventory objects with the NIC assigned IP addresses using the IPAM table and the NAT IP addresses using the NAT table, comprises:

replacing any of the VM inventory Objects specified in the source and/or destination of the configured firewall rules with a NIC assigned IP address of the VM inventory object if the user configured firewall rule specifies using the NIC assigned IP addresses; and replacing any of the remaining VM inventory objects specified in the source and/or destination of the configured firewall rules with a NAT IP address of the VM inventory objects by using the NAT table if the user configured firewall rule specifies using NAT assigned IP addresses.

12. The non-transitory computer-readable storage medium of claim 7 further comprising:

storing the configured firewall rules and the transformed fire wall rules in machine readable storage media.

13. A system for automatic firewall configuration in a virtual network environment, the system comprising:

a first host computing system including multiple virtual machines (VMs) on one or more computing networks;

a second host computing system including multiple VMs on the one or more computing networks;

a firewall engine coupled between the one or more computing networks of the first host computing system and the one or more computing networks of the second host computing system; and a virtual management server, comprising:

a virtualization management software including a firewall manager, an object attribute manager, an Internet protocol (IP) address manager, a network address translation (NAT) manager, and a user firewall rules manager to perform automatic firewall configuration in the virtual network environment, by:

mapping VM inventory objects to IP addresses of the VMs running on the first and second host computing systems, wherein the VM inventory objects are VMs and associated virtual network interface cards (vNICs);

configuring firewall rules using VM inventory objects based on the mapping, wherein the VM inventory objects are specified in a source and/or destination of the configured firewall rules;

transforming the firewall rules by replacing the VM inventory objects that are specified in the source and/or destination of the configured firewall rules with network interface card (NIC) assigned IP addresses using an IP address management table (IPAM) table and NAT IP addresses using a NAT table by the firewall manager;

sending the transformed firewall rules to the firewall engine for filtering communication from and to VMs running on the first host computing system on the one or more computing networks and communication from and to VMs running on the second host computing system on the one or more computer networks at a firewall according to the transformed firewall rules by the firewall manager;

determining whether there are any updates made to the configured firewall rules, the IPAM table, the NAT table and/or the VM inventory objects by the firewall manager; and automatically updating the transformed firewall rules sent to the firewall engine by repeating the steps of configuring, transforming and/or sending by the firewall manager when there are updates made to the configured firewall rules, the IPAM table, the NAT table and/or the VM inventory objects.

14. The system of claim 13, wherein the firewall manager is to:

continue the step to determine whether there are any updates made to the configured firewall rules, the IPAM table, the NAT table and/or the VM inventory objects when there are no updates made to the configured firewall rules, the IPAM table, the NAT table and/or the VM inventory objects.

15. The system of claim 14, wherin the firewall manager is further configured to:

dynamically maintain updates to a VM object attribute table, the IPAM table, the NAT table and/or the configured firewall rules by the firewall manager.

16. The system of claim 14, wherein the update includes addition of a VM, deletion of a VM, and/or change in network property of vNIC, addition/deletion of a vNIC to VM, change of VM assigned IP address, change of VM NAT address, change in user configured firewall rules such as add/delete of a rule or update of firewall rule in which the source/destination VM inventory object referenced changes.

17. The system of claim 13, wherein the firewall manager is configured to replace any of the VM inventory objects specified in the source and/or destination of the configured firewall rules with a NIC assigned IP address of the VM inventory object if the user configured firewall rule specifies using NIC assigned IP addresses, and wherein the firewall manager is further configured to replace any of the remaining VM inventory objects specified in the source and/or destination of the configured firewall rules with a NAT IP address of the VA inventory objects by using the NAT table if the user configured firewall rule specifies using NAT assigned IP addresses.

18. The system of claim 13, wherein the firewall manager is further configured to store the configured firewall rules and the transformed fire wall rules in machine readable storage media.

* * * * *